R. LOVE.
FERTILIZER DISTRIBUTER.
APPLICATION FILED SEPT. 6, 1904.
1,125,139.
Patented Jan. 19, 1915.
3 SHEETS—SHEET 3.
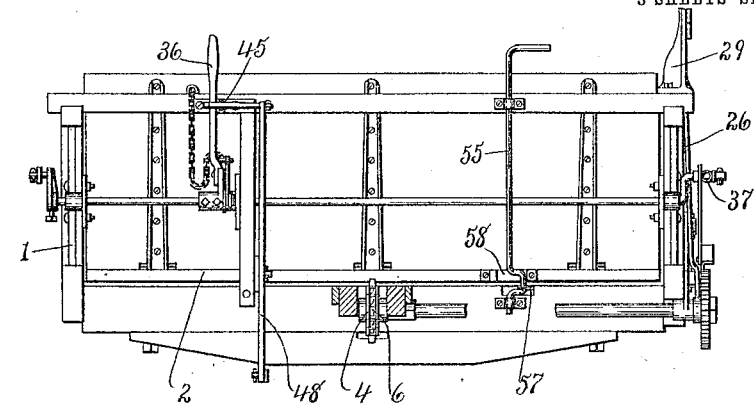
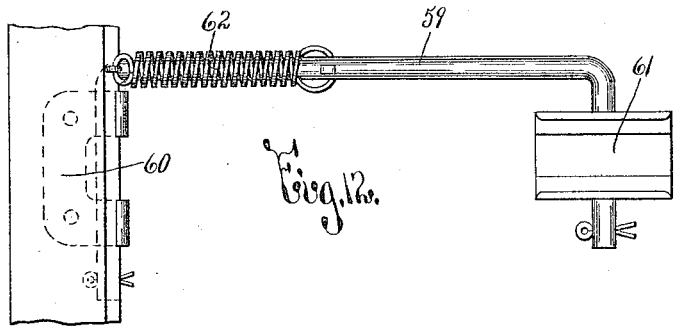
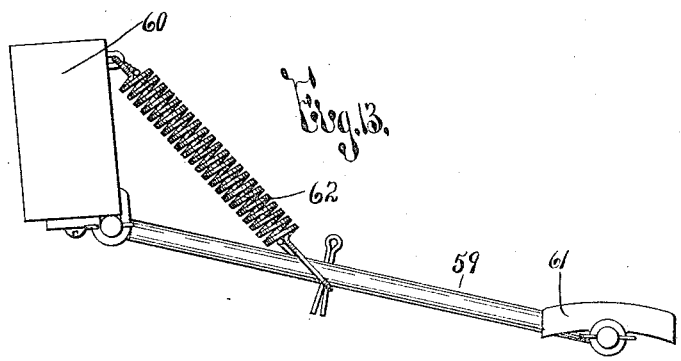
WITNESSES:
Chas. J. Toner.
Dora Lavine
INVENTOR
Robert Love
BY
Heyr Parsons
ATTORNEYS

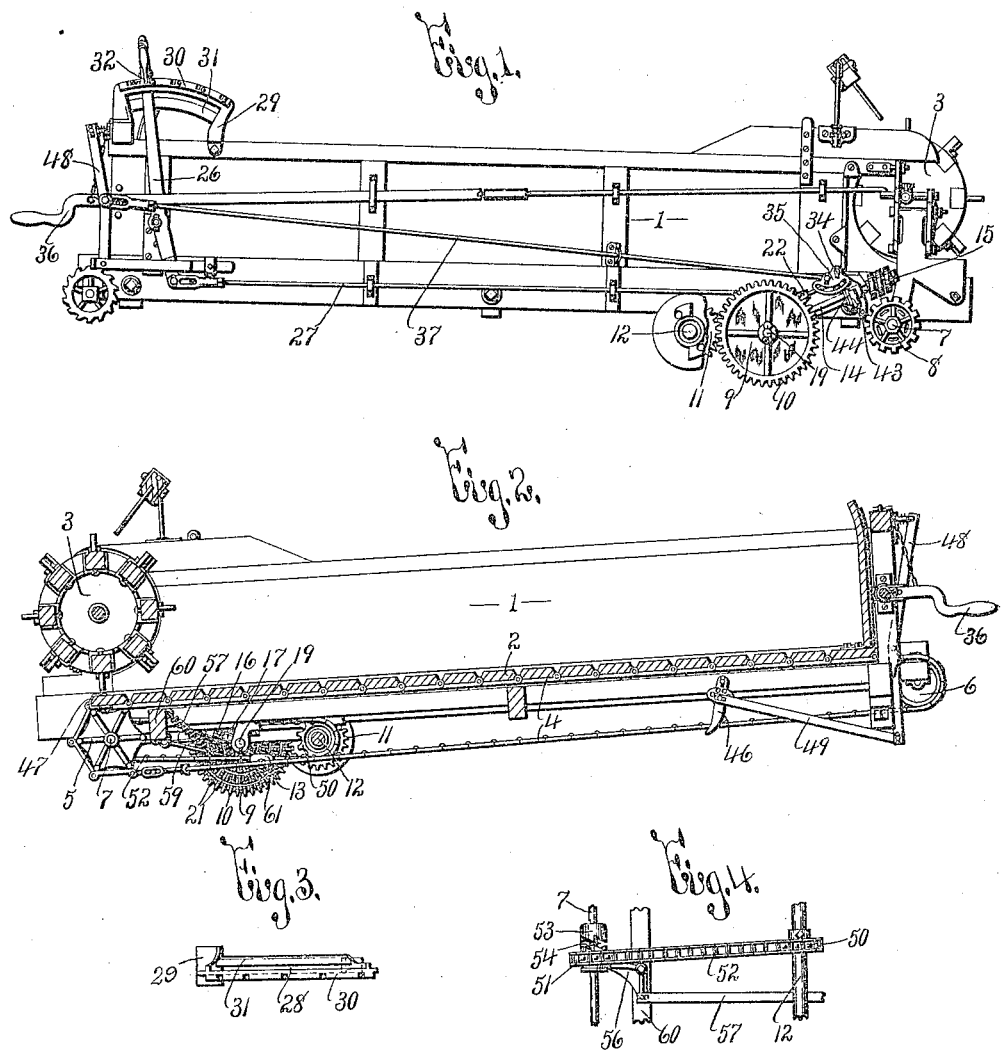

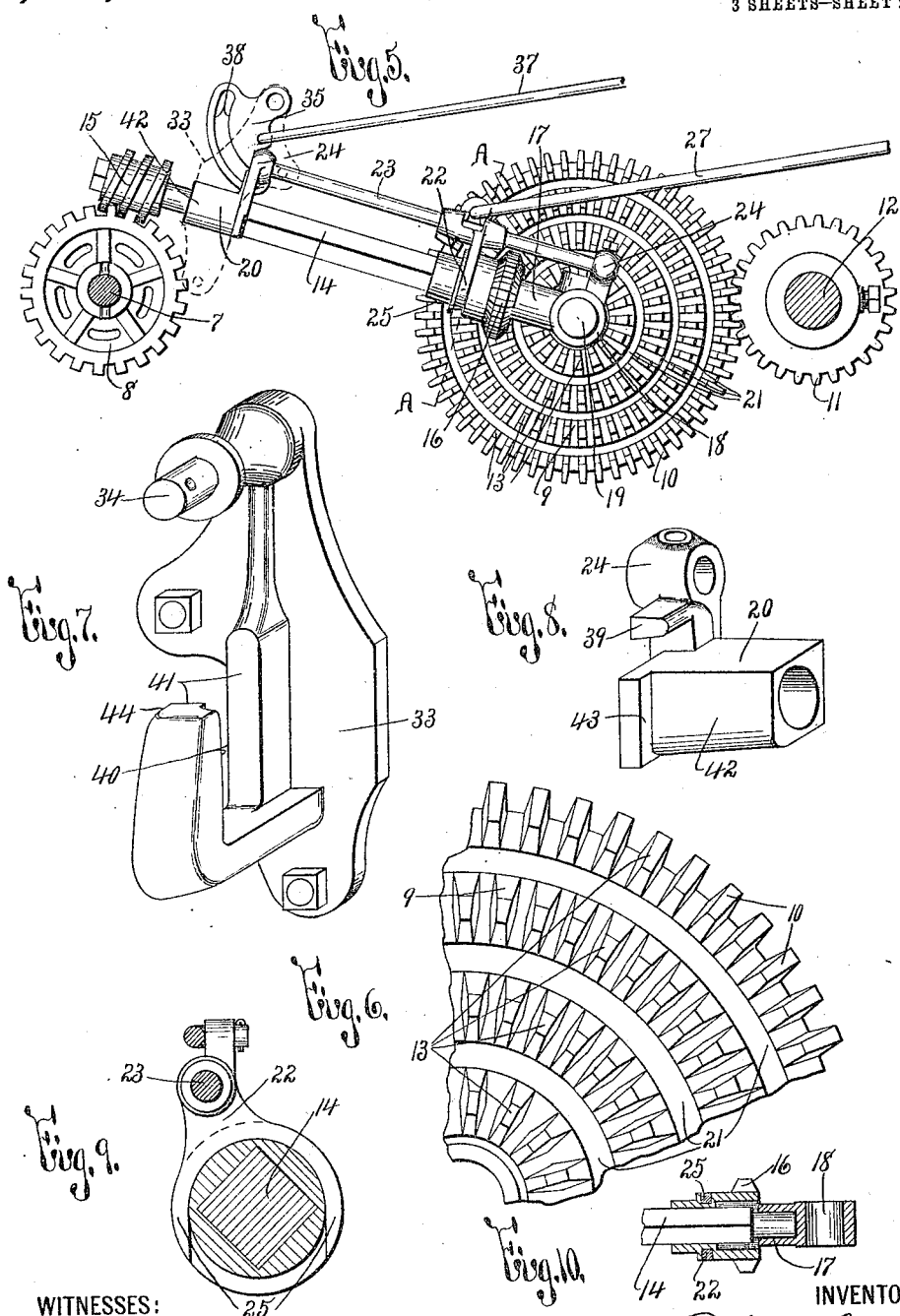

UNITED STATES PATENT OFFICE.

ROBERT LOVE, OF SYRACUSE, NEW YORK, ASSIGNOR, BY MESNE ASSIGNMENTS, TO DEERE & COMPANY, OF MOLINE, ILLINOIS, A CORPORATION OF ILLINOIS.

FERTILIZER-DISTRIBUTER.

1,125,139.  Specification of Letters Patent.  Patented Jan. 19, 1915.

Application filed September 6, 1904. Serial No. 223,326.

*To all whom it may concern:*

Be it known that I, ROBERT LOVE, of Syracuse, in the county of Onondaga and State of New York, have invented a certain new and useful Fertilizer-Distributer, of which the following is a specification.

My invention relates to fertilizer-distributers of the class comprising a wheeled body having a movable bottom upon which the fertilizer is placed, and a rotary beater for distributing the fertilizer as the latter is fed toward the beater by the bottom.

The object of the present invention is to provide a fertilizer-distributer of the class described, which is particularly simple in construction and highly efficient in operation.

To this end, the invention includes the combination and arrangement of component parts hereinafter described and particularly pointed out in the claims.

In the accompanying drawings, which illustrate one exemplification of my invention, Figure 1 is a side elevation of a fertilizer-distributer, with the supporting wheels omitted. Fig. 2 is a longitudinal sectional view of the same. Fig. 3 is a detail plan view of a bracket. Fig. 4 is a detail plan view of means for moving the bottom back to its initial position. Fig. 5 is a detail view, looking from the body side, of the driving mechanism for the bottom, parts being shown in section. Fig. 6 is a fragmentary view of the driving element. Fig. 7 is a perspective view of a supporting bracket. Fig. 8 is a perspective view of a sleeve. Fig. 9 is a detail sectional view on line A A, Fig. 5. Fig. 10 is a detail sectional view of a pinion and associated parts. Fig. 11 is a front elevation of the fertilizer body and associated parts. Fig. 12 is a plan view of a chain-support, and Fig. 13 is a side elevation of the same.

My fertilizer-distributer embodies, generally, a body or box 1 having a movable bottom 2, a rotary beater 3, and means for effecting the desired movements of the bottom. The body and the beater may be of any desirable construction, and said body is mounted upon suitable supporting wheels, not illustrated. The bottom 2 is movable lengthwise of the body 1 and preferably comprises a plurality of sections flexibly connected to one another and secured to an endless belt or chain 4 guided over a driving wheel 5 at the end of the body adjacent the beater, and over a guide-wheel or pulley 6 at the other end of the body.

The driving wheel 5 is preferably fixed to a shaft 7 extending transversely of the body, and journaled at its ends in the side frames thereof, and having one end extending through one of the side frames and carrying a gear-wheel 8, termed hereinafter the driven gear. Said driven gear 8 is rotated from the rear supporting wheels of the vehicle through the intermediary of transmitting mechanism, which can be manipulated during the operation of the machine to vary the movement of the driven gear in relation to the rear supporting wheels, and thereby vary the quantity of fertilizer discharged during the travel of the vehicle a predetermined distance. The transmitting mechanism includes a driving element, as a circular disk 9, journaled upon a spindle extending transversely in relation to the body and carried thereby, said disk 9 being prevented from axial movement and having a toothed periphery 10 intermeshing with a suitable gear 11, interposed between the same and the axle 12 of the rear supporting wheels of the vehicle, and said disk also having a plurality of concentrically arranged differential driving surfaces, as gear-rings 13, separated a distance from one another, and projecting from one face thereof, the teeth of the outermost ring 13 forming continuations of the peripheral teeth 10. The transmitting mechanism further includes a shaft 14 extending radially of the driving element 9 and carrying at one end a transmitting gear 15 movable into and out of mesh with the driven gear 8, and at its opposite end a pinion 16 designed to intermesh with the gear-rings 13. Said shaft 14 is preferably journaled at one end in a socket 17 extending radially from a collar 18, pivotally mounted on the spindle 19 carrying the driving element 9, which collar in the operation of the machine has no movement toward and from said driving element, and near its opposite end, said shaft 14 is journaled in a sleeve 20 supported by the body 1, and having no movement toward and from the latter, or in a direction parallel to the axis of the driving element.

The opposing ends of the teeth of adjacent gear-rings 13 diverge outwardly from their bases to their crowns, the teeth of the inner rings being of substantially truncated triangular shape in longitudinal section. The teeth of the intermeshing pinion 16, are of substantially the same truncated triangular shape in longitudinal section, their end walls being inclined in a reverse direction to, and at approximately the same degree as, the end walls of the teeth of the gear-rings 13. The spaces 21 separating the gear-rings from one another are of truncated triangular shape in cross-section and are of approximately the same widths at the bases of the teeth as the length of the crown of each tooth of the pinion 16, and of substantially the same widths between the crowns of said teeth as the length of the base of each tooth of the pinion, the cross-sectional shape of the spaces 21 thus corresponding to the longitudinal sectional shape of the teeth of the pinion 16. The pinion 16 is so mounted upon the shaft 14, that the two will rotate in unison and the former can move longitudinally of the latter. To this end, the shaft 14 is preferably formed of angular cross-sectional shape between the socket 17 and the sleeve 20, and the pinion is provided with a bore of corresponding shape in cross-section.

In order to shift the pinion 16 along the shaft 14 to carry the former into, or out of, mesh with any one of the gear-rings 13, a slide 22 is provided, guided upon a rod 23 which extends parallel to the shaft 14 and is supported at opposite ends in lugs 24, projecting from the collar 18 and sleeve 20 respectively, said slide 22 having a depending fork 25 engaging annular shoulders on a hub integral with the pinion 16. At the front of the body, a lever 26 is pivoted which is coupled to the slide 22 by a suitable link 27. This lever 26 is preferably movable in a guideway 28 in a bracket 29 arranged at one side of the driver's seat, said guideway being formed by two segmental bars 30, 31, spaced a distance apart and arranged one below the other. The uppermost bar 30 is provided with a series of notches arranged with reference to the gear-rings 13 of the driving element, and the handle of the lever 26 is provided with a latch 32 for detachably engaging walls of said notches. Characters are associated with each notch to denote the position of the pinion, relatively to the gear-rings, when the latch is alined therewith. It will be particularly noted that the pinion 16 is shifted radially of the driving element 9 in a direct rectilinear line; that the described construction does not necessitate the driving element or the pinion being first moved from each other in the direction of the axis of the driving element, to carry the teeth of the pinion out of the plane of the gear-rings 13, before said pinion 16 is shifted from one gear-ring 13 to another; that the teeth of the pinion 16 are entirely disengaged from one gear-ring before engagement with another gear-ring; and that the pinion 16 may, if desired, be held by the lever 26 in position with the teeth of said pinion in the spaces 21 between the gear-rings and parallel to the face of the driving element provided with said gear-rings, in which event, no motion will be transmitted by the pinion from the driving element.

Fixedly supported upon one side of the body 1, is a bracket 33 having a laterally projecting pin 34 upon which is pivoted a cam 35 operated from the driver's seat, by means of a rocking lever 36 pressed by a spring in one direction and the interposed link 37 for shifting the rear or outer end of the shaft 14 to carry the transmitting gear 15 into and out of mesh with the driven gear 8. The cam 35 preferably comprises a plate having a slot 38 therein eccentric to its pivot 34, into which slot a lug 39 on the sleeve 20 projects. In the pivotal movement of the cam 35, the sleeve 20 is raised and lowered, carrying with it the outer end of the shaft 14, and in order to guide the sleeve 20, the bracket 33 is provided with a guideway 40, having opposing flat vertical surfaces 41, against which corresponding surfaces 42 of the sleeve find bearings. The sleeve 20 is also provided with an additional flat surface 43, at right-angles to the surfaces first-mentioned, which coacts with a corresponding additional surface 44 on the bracket. By this construction, the sleeve 20 is not only guided in the shifting movement of the shaft 14 and prevented from movement lengthwise of the axis of the driving element 9, but is also maintained at all times in an upright position to properly support the end of the guide-rod 23.

A lock 45, located at the front of the body 1, engages the lever 36 which is used to shift the shaft 14, when said lever is moved into the position which throws the gear 15 into engagement with the driven gear 8. To automatically release this lock, when the movable bottom 2 has completed its travel toward the beater 3, tripping mechanism is provided. This mechanism includes an arm 46 pivoted beneath the body 1, having its free end extending into the path of an engaging surface 47 on the bottom, and a lever 48 pivoted intermediate of its length to the body 1, coupled by a link 49 to the arm 46, and having a free end designed to engage a movable member of the lock 45 to release the latter.

To return the movable bottom 2 to its starting position, mechanism is provided driven from the rear axle 12 of the vehicle, which mechanism is thrown into operation by a suitable manually-operated lever and out of operation automatically. This mechanism preferably includes a sprocket-wheel 50 on the axle 12, a second sprocket-wheel 51 loose on the shaft 7, a chain 52 for transmitting the movement of the sprocket-wheel 50 to the sprocket-wheel 51, a clutch-member 53 fixed to the shaft 7 and having a surface designed to grip a corresponding surface on the opposed face of the sprocket-wheel 51, and a spring 54 tending to hold said surfaces separated. The sprocket-wheel 51 is shifted into engagement with the clutch-member 53 by a substantially vertical rocking lever 55 mounted at the front of the body and having a crank at its lower end, a bell-crank lever 56 pivoted to the body and having a forked arm engaging annular shoulders on the sprocket-wheel 51, and a link 57 interposed between the other arm of the bell-crank lever and the crank of the rocking lever 55. When the latter lever is rocked to bring the crank-portion thereof into alinement with the link 57, in which position the sprocket-wheel 51 is held in engagement with the clutch-member 53, the parts will be locked against movement. The parts are automatically released when the bottom 2 arrives at its starting position, by a projection 58 on the front end thereof, having an inclined surface, which strikes the crank of the lever 55 and pushes said crank out of alinement with the link 57. An arm 59, pivotally supported at one end in a bracket, secured to the rear cross-bar 60 of the body-frame, carries at its front end a pivotally mounted shoe 61, which is held in contact with the chain 52 by a spring 62 interposed between the cross-bar 60 and the intermediate portion of said arm 59 for taking up the slack in the sprocket-chain 52 and thereby maintaining the engagement of said sprocket-chain and the laterally shiftable sprocket-wheel 51 during the shifting of said sprocket-wheel.

The construction and operation of my invention will now be readily understood upon reference to the foregoing description and the accompanying drawing, and it will be noted that more or less change may be made in the component parts thereof, without departing from the spirit of my invention.

Having thus fully described my invention, what I claim as new and desire to secure by Letters-Patent, is:—

1. In a fertilizer-distributer, the combination with a body, a driving axle, a beater, a movable bottom, a belt carrying the latter, a driving wheel for the belt, a shaft carrying said wheel, means for rotating the shaft in one direction to move the bottom toward the beater, and mechanism for rotating the shaft in an opposite direction to move the bottom from the beater, the latter mechanism comprising a sprocket-wheel on said shaft, a sprocket-wheel on the driving axle, and a chain running over said sprocket-wheels; of an arm pivotally supported by the body, a shoe pivoted to the opposite end of the arm, and a spring coacting with said arm to hold the shoe in engagement with said chain, substantially as and for the purpose set forth.

2. In a fertilizer-distributer, the combination with a body having a frame including a cross-bar, a driving axle, a beater, a movable bottom, a belt carrying the latter, a driving-wheel for the belt, a shaft carrying said wheel, means for rotating the shaft in one direction to move the bottom toward the beater, and mechanism for rotating the shaft in an opposite direction to move the bottom from the beater, said mechanism comprising a sprocket-wheel on said shaft, a sprocket-wheel on the driving axle, and a chain running over said sprocket-wheels; of an arm pivoted at one end to said cross-bar and projecting in advance of the same, a shoe pivoted to the free end of the arm, and a spring interposed between said cross-bar and the intermediate portion of the arm, substantially as and for the purpose described.

In testimony whereof, I have hereunto signed my name in the presence of two attesting witnesses, at Syracuse, in the county of Onondaga, in the State of New York, this 24th day of February, 1904.

ROBERT LOVE.

Witnesses:
   D. LAVINE,
   S. DAVIS.